(12) United States Patent
Seki et al.

(10) Patent No.: US 7,135,802 B2
(45) Date of Patent: Nov. 14, 2006

(54) CLAW POLE MOTOR STATOR

(75) Inventors: Masahiro Seki, Saitama (JP); Nobuyuki Imai, Saitama (JP); Shin Aoki, Saitama (JP); Hiroyuki Kikuchi, Saitama (JP); Tadanobu Takahashi, Saitama (JP); Shigeru Tajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/852,702

(22) Filed: May 25, 2004

(65) Prior Publication Data

US 2005/0012427 A1 Jan. 20, 2005

(30) Foreign Application Priority Data

Jun. 4, 2003 (JP) ............................. 2003-158898
Aug. 26, 2003 (JP) ............................. 2003-302017

(51) Int. Cl.
  *H02K 1/14* (2006.01)
  *H02K 1/20* (2006.01)
  *H02K 1/12* (2006.01)
(52) U.S. Cl. ...................... 310/257; 310/216
(58) Field of Classification Search ................ 310/257, 310/254, 216, 217, 179, 180
See application file for complete search history.

(56) References Cited

U.S. PATENT DOCUMENTS

| | | | | |
|---|---|---|---|---|
| 6,121,712 A | * | 9/2000 | Sakamoto | 310/254 |
| 6,153,953 A | * | 11/2000 | Isozaki et al. | 310/49 R |
| 6,765,321 B1 | * | 7/2004 | Sakamoto | 310/49 R |
| 6,815,863 B1 | * | 11/2004 | Jack et al. | 310/254 |
| 6,946,771 B1 | * | 9/2005 | Cros et al. | 310/257 |
| 2002/0070627 A1 | * | 6/2002 | Ward et al. | 310/254 |

FOREIGN PATENT DOCUMENTS

JP 7-227075 8/1995

* cited by examiner

*Primary Examiner*—Tran Nguyen
(74) *Attorney, Agent, or Firm*—Arent Fox PLLC

(57) ABSTRACT

A claw pole motor stator includes teeth for N phases (N being a natural number of 3 or more), for example, U-phase, V-phase, and W-phase teeth juxtaposed in an axial direction, return paths for interconnecting the U-phase, V-phase, and W-phase teeth, and (N−1) annular slots formed between the U-phase, V-phase, and W-phase teeth. A U-phase coil and one V-phase coil are housed in one annular slot, and another V-phase coil and a W-phase coil are housed in the other annular slot. In this way, only N sets of teeth and N−1 annular slots are provided for N phases, and thus it is possible to minimize the thickness in the axial direction of the stator compared with a conventional stator which requires 2N sets of teeth and N annular slots for N phases.

20 Claims, 12 Drawing Sheets

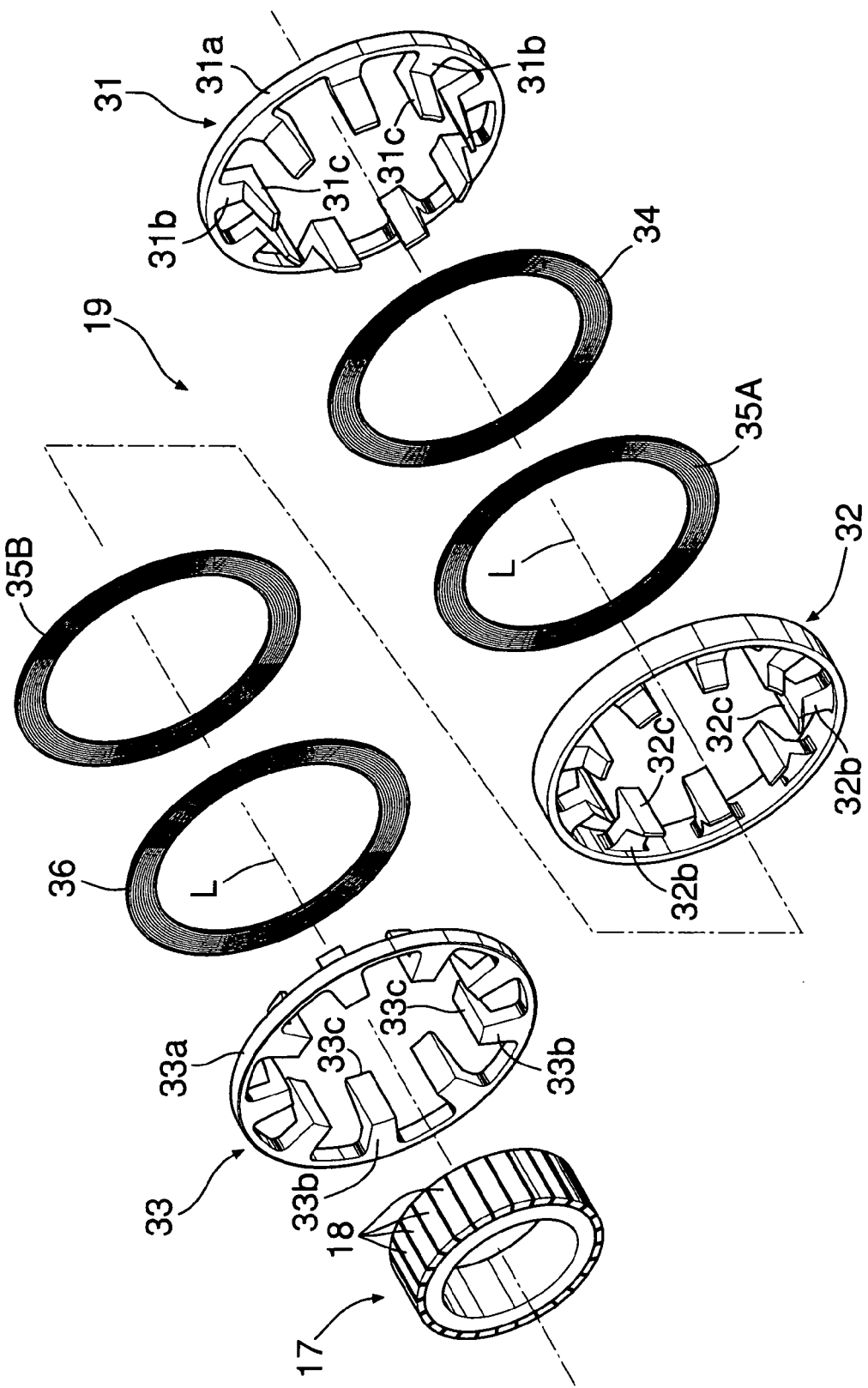

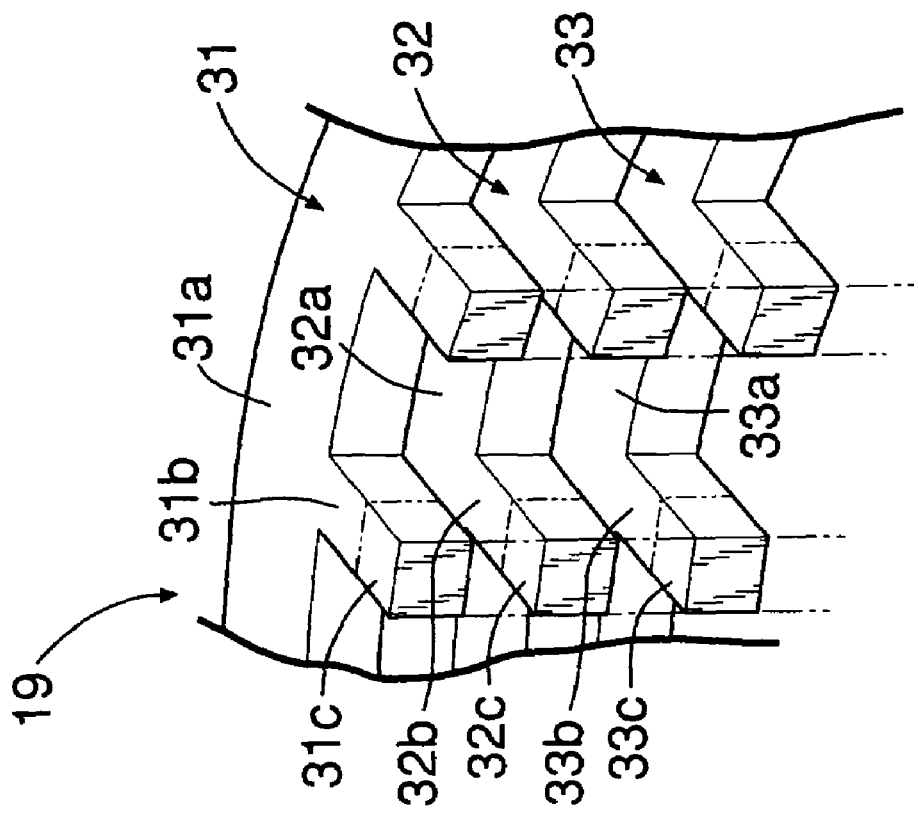
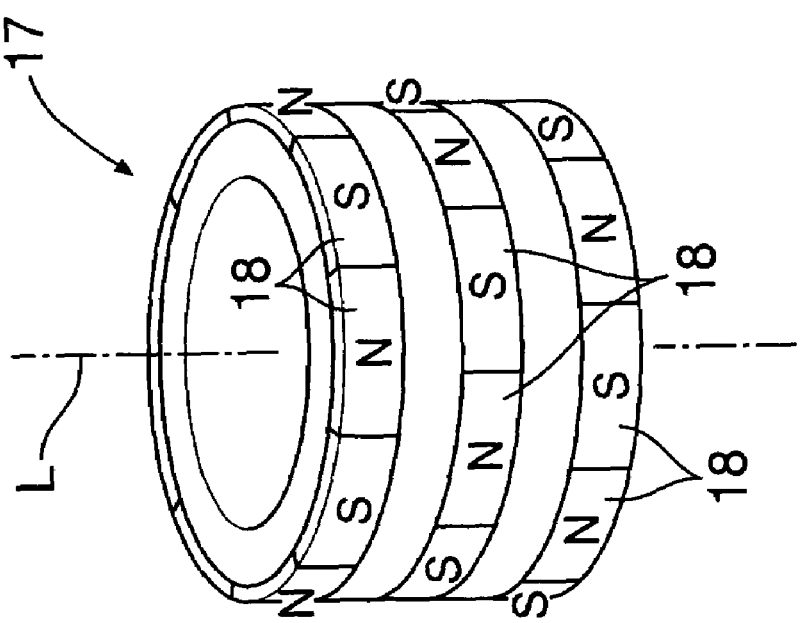

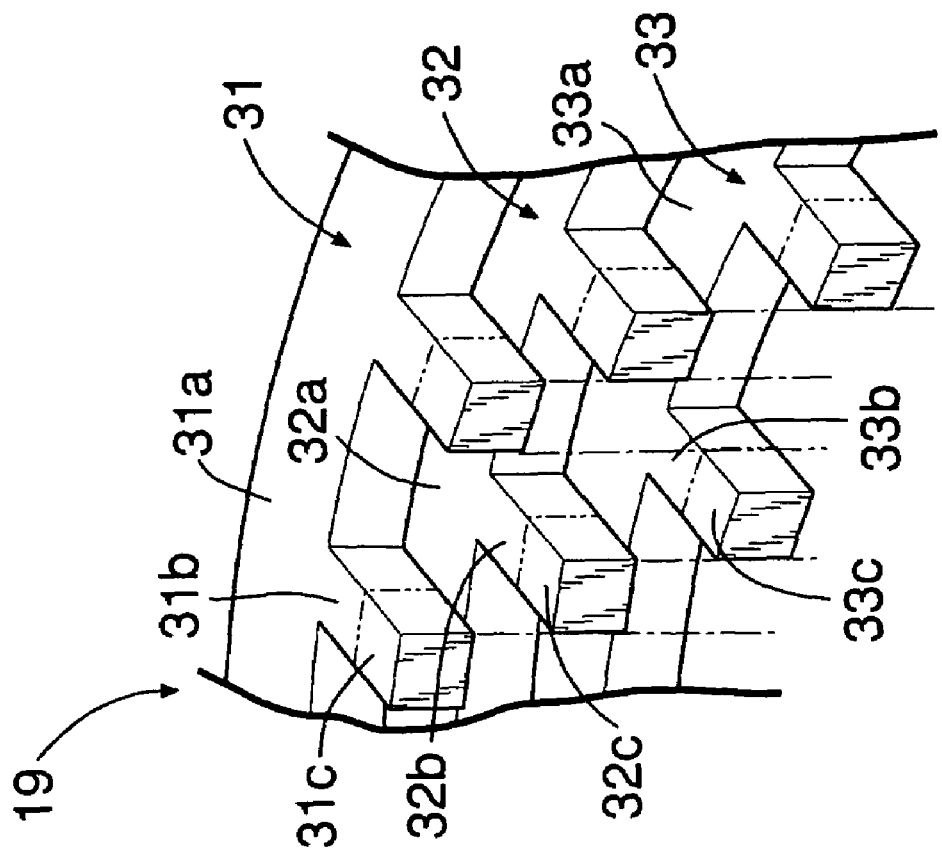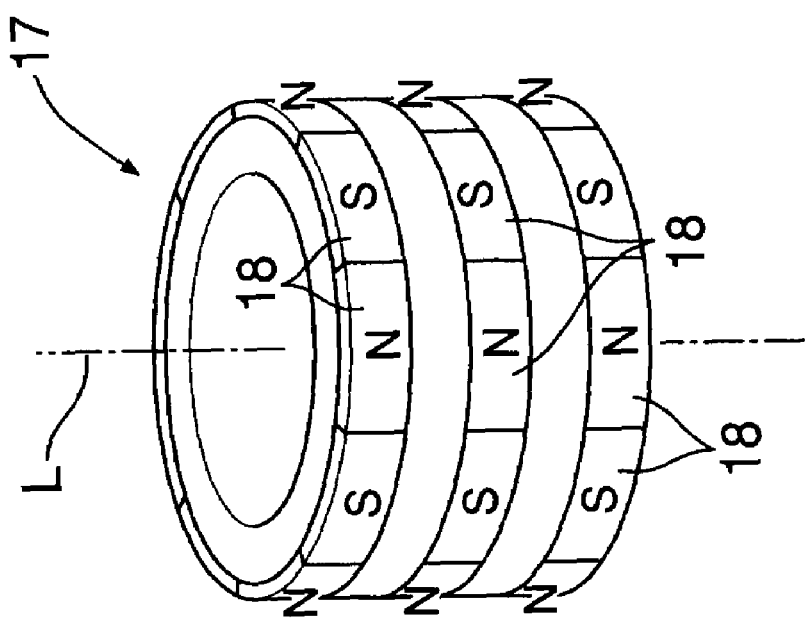

CLAW POLE MOTOR STATOR

BACKGROUND OF THE INVENTION

1. Field of the Invention

The present invention relates to a claw pole motor stator in which teeth for N phases juxtaposed in an axial direction have coils for N phases wound therearound within a plane perpendicular to an axis.

2. Description of Related Art

A type of claw pole motor stator is disclosed in Japanese Patent Application Laid-open No. 7-227075. The stator is provided with three stator units that correspond to each of a U-phase, a V-phase, and a W-phase. Each stator unit is formed with a U-shaped cross-section having two sets of teeth spaced from each other in the axial direction, and a return path to connect the teeth at radially outer ends thereof. By energizing an annular coil housed within the U-shaped cross-section stator unit, an independent magnetic path is generated, which magnetizes two types of poles having different polarities. The poles are projectingly provided at radially inner ends of the two sets of teeth of the stator unit and face a rotor.

However, in the above-mentioned conventional arrangement, the stator is formed by stacking the U-phase, V-phase, and W-phase stator units in the axial direction. Since each stator unit has an annular slot housing a coil therewithin and is further provided with two teeth sets and two types of poles, the axial thickness of the stator unit is disadvantageously large, and the axial dimensions of the stator are disadvantageously increased.

In particular, when a claw pole motor is disposed between an engine and a transmission of a hybrid vehicle, it is desirable that the thickness of the motor be as thin as possible. Because the above-mentioned conventional claw pole motor uses a relatively thick stator, it is rather difficult for the conventional motor to meet this objective.

SUMMARY OF THE INVENTION

The present invention has been achieved with the above-mentioned circumstances in mind, and it is an object of the present invention to minimize the axial thickness of a claw pole motor stator.

In order to accomplish such an object, in accordance with a first aspect of the present invention, there is proposed a claw pole motor stator that includes teeth for N phases (N being a natural number of 3 or more) juxtaposed in the axial direction, return paths for interconnecting the teeth for N phases, (N–1) annular slots formed between the teeth for N phases, and coils for N phases disposed in the (N–1) annular slots.

According to the arrangement of the first aspect, since the teeth for N phases juxtaposed in the axial direction are interconnected by the return paths, and the coils for N phases are disposed in the N–1 annular slots formed between the teeth for N phases, it is possible to provide only N teeth and N–1 annular slots for N phases and reduce the axial thickness of the stator compared with the conventional stator in which 2N teeth and N annular slots are required for N phases.

Furthermore, in accordance with a second aspect of the present invention, there is proposed a claw pole motor stator wherein a plurality of poles project radially inward from radially inner ends of the teeth for N phases, the poles being arranged in the peripheral direction at predetermined intervals and having a radially inner end thereof facing an outer peripheral face of a rotor.

According to the arrangement of the second aspect, since the plurality of poles projecting radially inward from the radially inner ends of the teeth for N phases are arranged in the peripheral direction at predetermined intervals and face the outer peripheral face of the rotor, the air gap between the poles and the rotor is decreased while the output torque of the rotor is increased.

Moreover, in accordance with a third aspect of the present invention, there is proposed a claw pole motor stator wherein the poles for N phases are arranged in phase with each other. Additionally, magnets of the rotor are arranged such that the magnetic poles of the same polar sign are displaced in the peripheral direction relative to the poles for each phase to generate magnetic fluxes that are displaced by electrical angles of 360°/N.

According to the arrangement of the third aspect, since the poles for N phases are arranged in phase with each other and the magnetic poles of the same polar sign of the magnets of the rotor are displaced in the peripheral direction so that magnetic fluxes generated by these magnets are displaced relative to the poles for each phase by electrical angles of 360°/N, the structure of the claw pole motor stator is simplified by arranging the poles of the stator to be in phase with each other.

Furthermore, in accordance with a fourth aspect of the present invention, there is proposed a claw pole motor stator wherein the poles for N phases are displaced by electrical angles of 360°/N relative to each other. Additionally, magnets of the rotor are arranged such that the magnetic poles of the same polar sign are aligned in the axial direction to generate magnetic fluxes that are in phase with each other in the axial direction.

According to the arrangement of the fourth aspect, since the magnets of the rotor are arranged so that the magnetic poles of the same polar sign are aligned in the axial direction, and the poles for N phases are displaced by an electrical angle of 360°/N, the structure of the claw pole stator is simplified by arranging the magnetic fluxes generated by the rotor to be in phase with each other.

Moreover, in accordance with a fifth aspect of the present invention, there is proposed a claw pole motor stator wherein the radially inner ends of the poles for each phase extend in the axial direction along the outer peripheral face of the rotor.

According to the arrangement of the fifth aspect, since the radially inner ends of the poles for each phase extend axially along the outer peripheral face of the rotor, the output torque is increased by effectively using the magnetic flux generated by the rotor.

Furthermore, in accordance with a sixth aspect of the present invention, there is proposed a claw pole motor stator wherein the radially inner ends of the poles for each phase extend to the axial ends of the rotor.

According to the arrangement of the sixth aspect, since the radially inner ends of the poles for each phase extend to the axial ends of the rotor, the output torque is increased by maximizing the use of the magnetic flux generated by the rotor and the structure of the claw pole motor stator is simplified by arranging the magnetic fluxes generated by the rotor to be in phase with each other.

Moreover, in accordance with a seventh aspect of the present invention, there is proposed a claw pole motor stator wherein the return paths, the teeth, or the poles are formed from any one of a solid magnetic substance, a solid sintered material, and a compacted powder material.

According to the arrangement of the seventh aspect, since the return paths, the teeth, or the poles are formed from any one of the solid magnetic substances, the solid sintered material, and the compacted powder material, forming the components of the present invention by molding is easier relative to when the components are formed from a laminated steel sheet. In particular, when a solid magnetic substance or a solid sintered material is used, the overall cost of the stator is substantially reduced. Moreover, when a compacted powder material is used, the loss of magnetic flux is substantially reduced.

Furthermore, in accordance with an eighth aspect of the present invention, there is proposed a claw pole motor stator wherein the return paths, the teeth, and the poles are formed integrally or separately.

According to the arrangement of the eighth aspect, since the return paths, the teeth, and the poles are formed integrally or separately, it is possible to increase the degrees of freedom in the design.

Moreover, in accordance with a ninth aspect of the present invention, there is proposed a claw pole motor stator wherein the cross-sectional shape of a conductor of the coil of each phase is any one of rectangular, regular polygonal, and circular.

According to the arrangement of the ninth aspect, when the cross-sectional shape of the conductor of the coil is rectangular or regular polygonal, the packing factor of the coil is increased, and when the cross-sectional shape is circular, the overall cost is substantially reduced.

Furthermore, in accordance with a tenth aspect of the present invention, there is proposed a claw pole motor stator wherein the coil housed in the annular slot is fixedly held between adjacent teeth.

According to the arrangement of the tenth aspect, since the coil housed in the annular slot is fixedly held between adjacent teeth, the coil is fixable without using any special fixing member.

Moreover, in accordance with an eleventh aspect of the present invention, there is proposed a claw pole motor stator wherein the coil for a phase $m$ and the coil for a phase m+1 are disposed within an $m_{th}$ annular slot (m being a natural number of N−1 or less).

According to the arrangement of the eleventh aspect, since the coil for the phase $m$ and the coil for the phase m+1 are disposed in the $m^{th}$ annular slot, the number of annular slots required by the N-phase stator is reduced to N−1, thereby reducing the axial thickness of the stator.

Furthermore, in accordance with a twelfth aspect of the present invention, there is proposed a claw pole motor stator wherein the coil for the phase $m$ and the coil for the phase m+1, which are disposed within the $m^{th}$ annular slot, have magnetomotive forces in reversed directions.

According to the arrangement of the twelfth aspect, since the magnetomotive forces of the coil for the phase $m$ and the coil for the phase m+1, which are disposed in the $m^{th}$ annular slot, are in reversed directions, a rotating magnetic field is formed in the N-phase stator poles.

Moreover, in accordance with a thirteenth aspect of the present invention, there is proposed a claw pole motor stator wherein the coil for the phase m+1 disposed in the $m^{th}$ annular slot and the coil for the phase m+1 disposed in the $(m+1)^{th}$ annular slot have magnetomotive forces in reversed directions.

According to the arrangement of the thirteenth aspect, since the coil for the phase m+1 disposed in the $m^{th}$ annular slot and the coil for the phase m+1 disposed in the $(m+1)^{th}$ annular slot have magnetomotive forces in reversed directions, a rotating magnetic field is formed in the N-phase stator poles.

Furthermore, in accordance with a fourteenth aspect of the present invention, there is proposed a claw pole motor stator wherein the coils for N phases are star-connected or delta-connected.

According to the arrangement of the fourteenth aspect, since the coils for N phases are star-connected or delta-connected, a part of a circuit may be shared without requiring a circuit for each of three phases, resulting in a reduction in the number of switching elements, and the like, as well as simplifying the circuit.

Moreover, in accordance with a fifteenth aspect of the present invention, there is proposed a claw pole motor stator wherein the stator includes a cooling structure.

According to the arrangement of the fifteenth aspect, since the stator includes the cooling structure, an increase in temperature due to heat generated by the coil during operation of the motor is prevented.

Furthermore, in accordance with a sixteenth aspect of the present invention, there is proposed a claw pole motor stator wherein the cooling structure is provided in at least one of the interior portion and the peripheral portion of the stator.

According to the arrangement of the sixteenth aspect, since the cooling structure is provided in at least one of the interior portion and the peripheral portion of the stator, the stator is cooled effectively.

Moreover, in accordance with a seventeenth aspect of the present invention, there is proposed a claw pole motor stator wherein the cooling structure provided in the peripheral portion of the stator includes at least one recess, at least one projection, or a plurality of cooling fins.

According to the arrangement of the seventeenth aspect, since the cooling structure in the peripheral portion of the stator includes the recess, the projection, or the plurality of cooling fins, the contact area between a cooling medium and the stator is increased, which enhances the cooling effect.

Furthermore, in accordance with an eighteenth aspect of the present invention, there is proposed a claw pole motor stator wherein the cooling structure provided in the interior of the stator has at least one cooling space.

According to the arrangement of the eighteenth aspect, since the cooling structure in the interior of the stator includes the cooling space, a cooling medium is able to flow into the cooling space, thereby enhancing the stator cooling effect.

Moreover, in accordance with a nineteenth aspect of the present invention, there is proposed a claw pole motor stator wherein the cooling space is formed by cooperation between the stator and a holder for the stator.

According to the arrangement of the nineteenth aspect, since the cooling space is formed by cooperation between the stator and the holder, it is possible to form a large capacity cooling space without impairing the strength of the stator.

Furthermore, in accordance with a twentieth aspect of the present invention, there is proposed a claw pole motor stator wherein the cooling space is formed by cooperation between the stator, a holder for the stator, and a reinforcing ring held between the stator and the holder.

According to the arrangement of the twentieth aspect, since the cooling space is formed by cooperation between the stator, the holder, and the reinforcing ring held between the stator and the holder, not only is a large capacity cooling space formed without impairing the strength of the stator, but the stator is effectively reinforced with the reinforcing ring.

Moreover, in accordance with a twenty-first aspect of the present invention, there is proposed a claw pole motor stator wherein the cooling structure cools the stator using at least one of cooling water and cooling air.

According to the arrangement of the twenty-first aspect, since the stator is cooled with cooling water or cooling air, it is unnecessary to use any special cooling medium, thus reducing manufacturing costs.

The above-mentioned aspects and other aspects, characteristics, and advantages of the present invention will become apparent from an explanation of preferred embodiments described in detail below by reference to the attached drawings.

BRIEF DESCRIPTION OF THE DRAWINGS

FIG. 7 is an exploded view of the stator in FIG. 6;

FIGS. 8A and 8B are schematic views of a claw pole motor stator and a rotor in accordance with a second embodiment of the present invention;

FIGS. 9A and 9B are schematic views of a claw pole motor stator and a rotor in accordance with a third embodiment of the present invention;

DETAILED DESCRIPTION OF PREFERRED EMBODIMENTS

Figure 1:
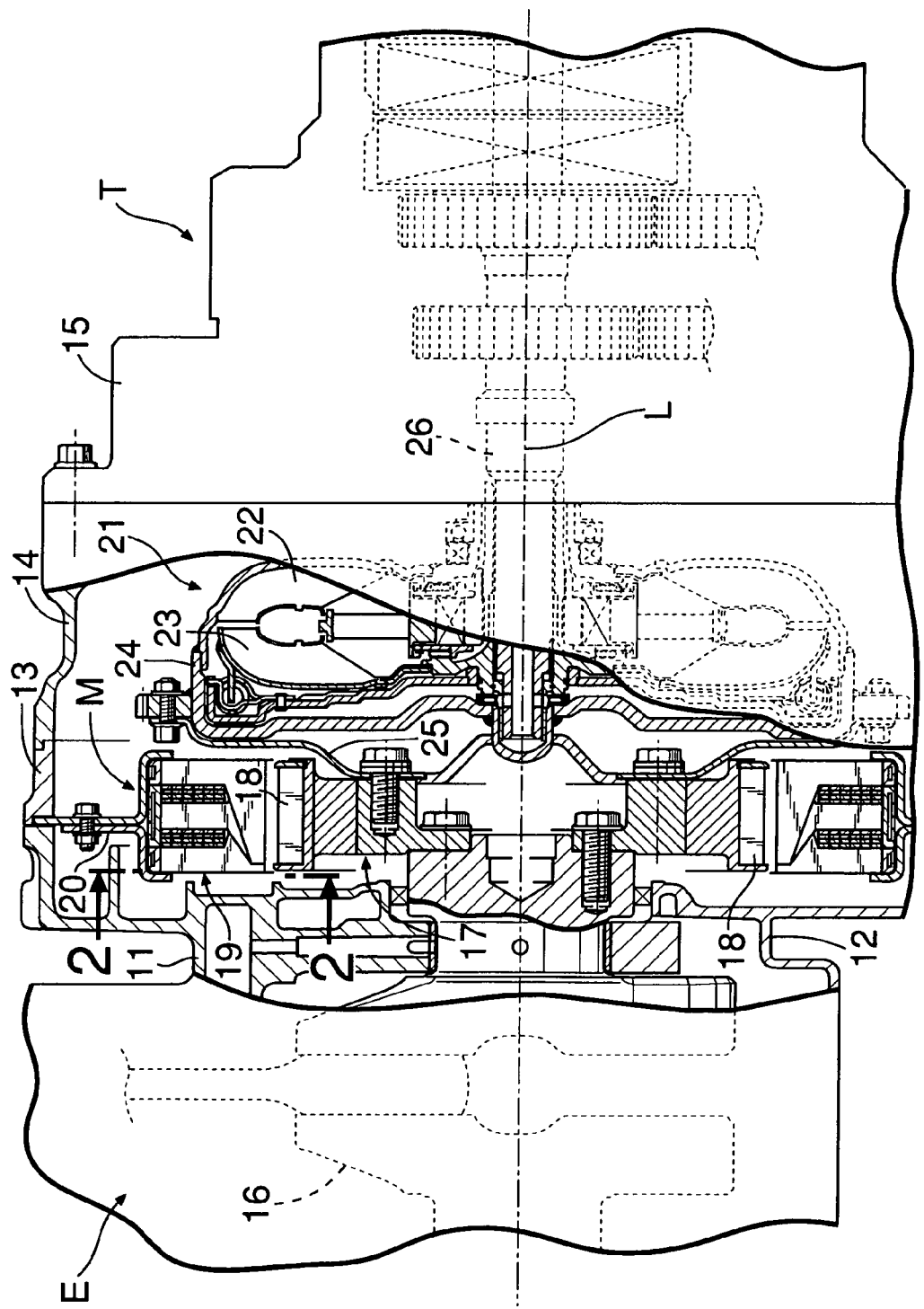
FIG. 1 is a partial cross-sectional view of a hybrid vehicle power unit equipped with a claw pole motor according to a first embodiment of the present invention.
Figure 2:
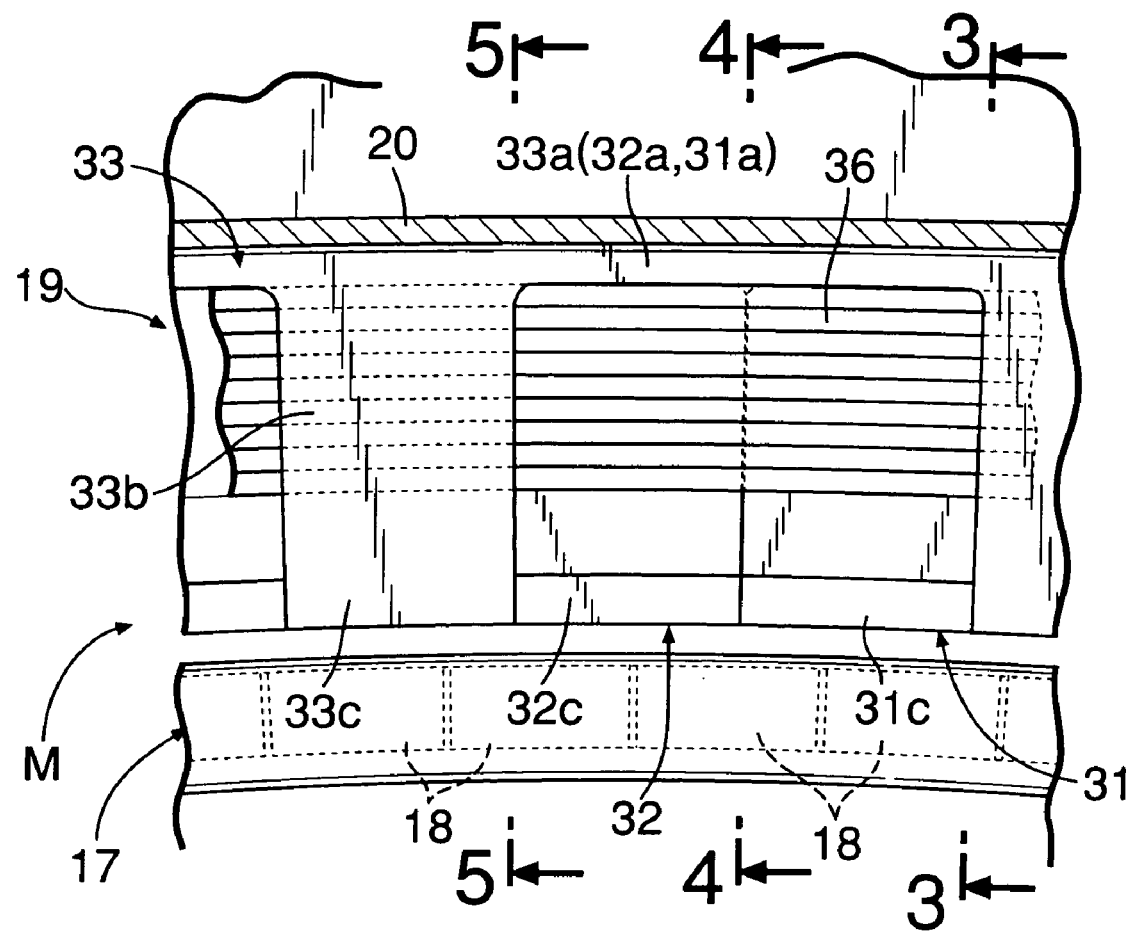
FIG. 2 is an enlarged sectional view taken along line 2—2 in FIG. 1.

As shown in FIG. 1, a hybrid vehicle power unit is equipped with a claw pole motor M disposed between an engine E and a transmission T. A motor case 13, a torque converter case 14, and a transmission case 15 are joined to right side faces of a cylinder block 11 and a crankcase 12 of the engine E. A rotor 17 of the motor M is fixed to a shaft end of a crankshaft 16 supported between the cylinder block 11 and the crankcase 12. An annular stator 19 faces, across a predetermined air gap, a plurality of permanent magnets 18 fixed to the outer periphery of the rotor 17. A stator holder 20, which supports the stator 19, is fixedly held between mating faces of the cylinder block 11 and crankcase 12, and the motor case 13.

A torque converter 21 housed in the torque converter case 14 includes a turbine runner 22 and a pump impeller 23. A side cover 24 joined to the turbine runner 22 covers the pump impeller 23 and is connected to the rotor 17 of the motor M via a drive plate 25. The pump impeller 23 of the torque converter 14 is joined to the left end of a main shaft 26 supported in the transmission case 15.

The structure of the stator 19 of the motor M, which is operated by three-phase alternating current, is explained with reference to FIGS. 2 to 7.

As is clear from FIG. 7, the stator 19 includes a U-phase stator ring 31, a V-phase stator ring 32, and a W-phase stator ring 33, each of which is integrally molded from a compacted powder material, and one U-phase coil 34, two V-phase coils 35A and 35B, and one W-phase coil 36. The U-phase stator ring 31, the V-phase stator ring 32, and the W-phase stator ring 33 are superimposed in the direction of an axis L.

Figure 3:
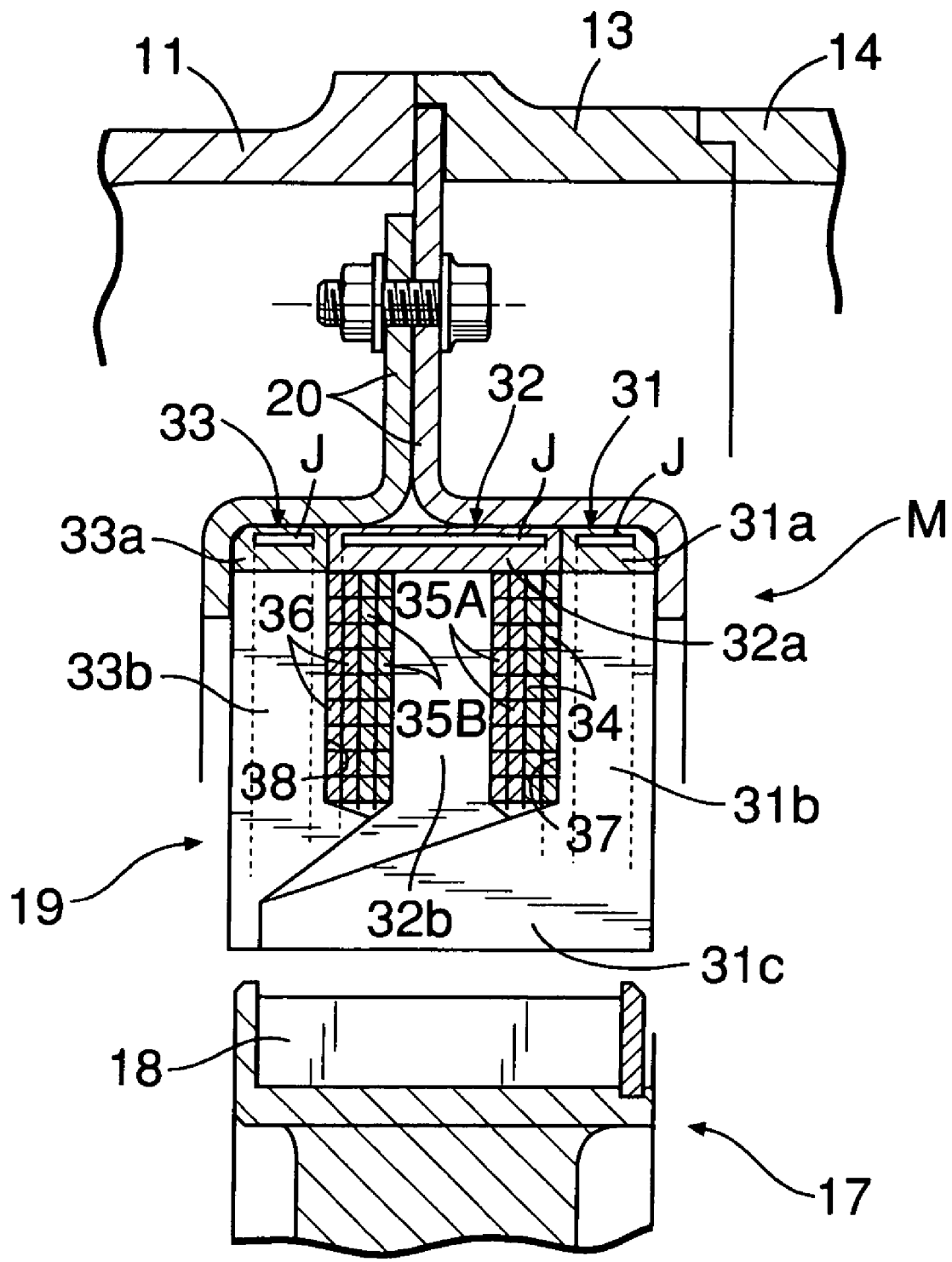
FIG. 3 is a sectional view taken along line 3—3 in FIG. 2.
Figure 6:
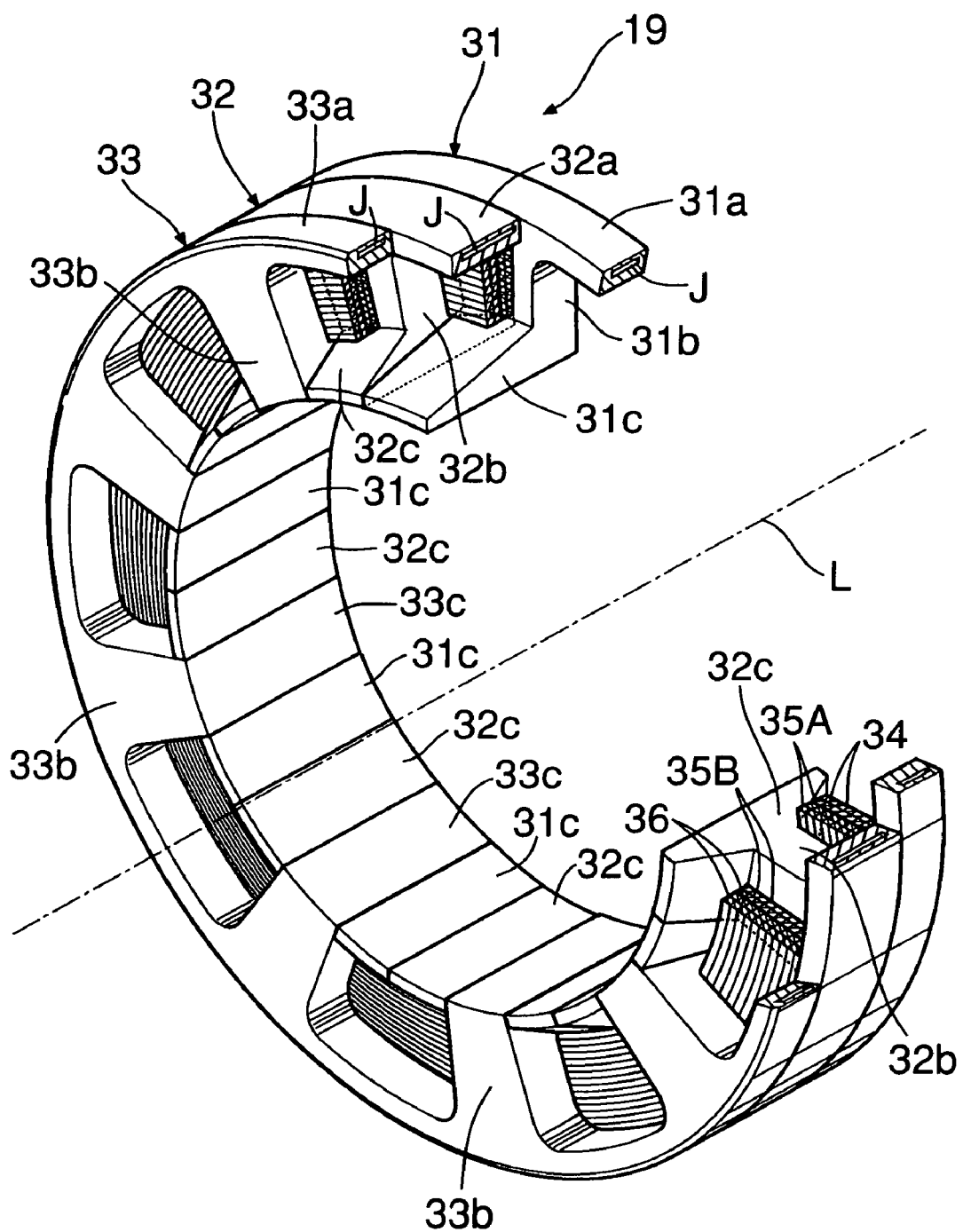
FIG. 6 is a partial cutaway perspective view of a stator according to the present invention.

As is clear from FIGS. 3, 6, and 7, the U-phase stator ring 31 includes an annular return path 31a, nine teeth 31b extending radially inward from peripherally equidistant positions on the return path 31a, and a plurality of, e.g., nine poles 31c further extending radially inward from radially inner ends of these teeth 31b. The radially inner end of each pole 31c bends into an L-shape and extends toward one side along the axial L direction while tapering. The teeth 31b are portions corresponding to the height, in the radial direction, of the coils 34, 35A, 35B, and 36. The poles 31c are portions located radially inside the teeth 31b.

Figure 4:
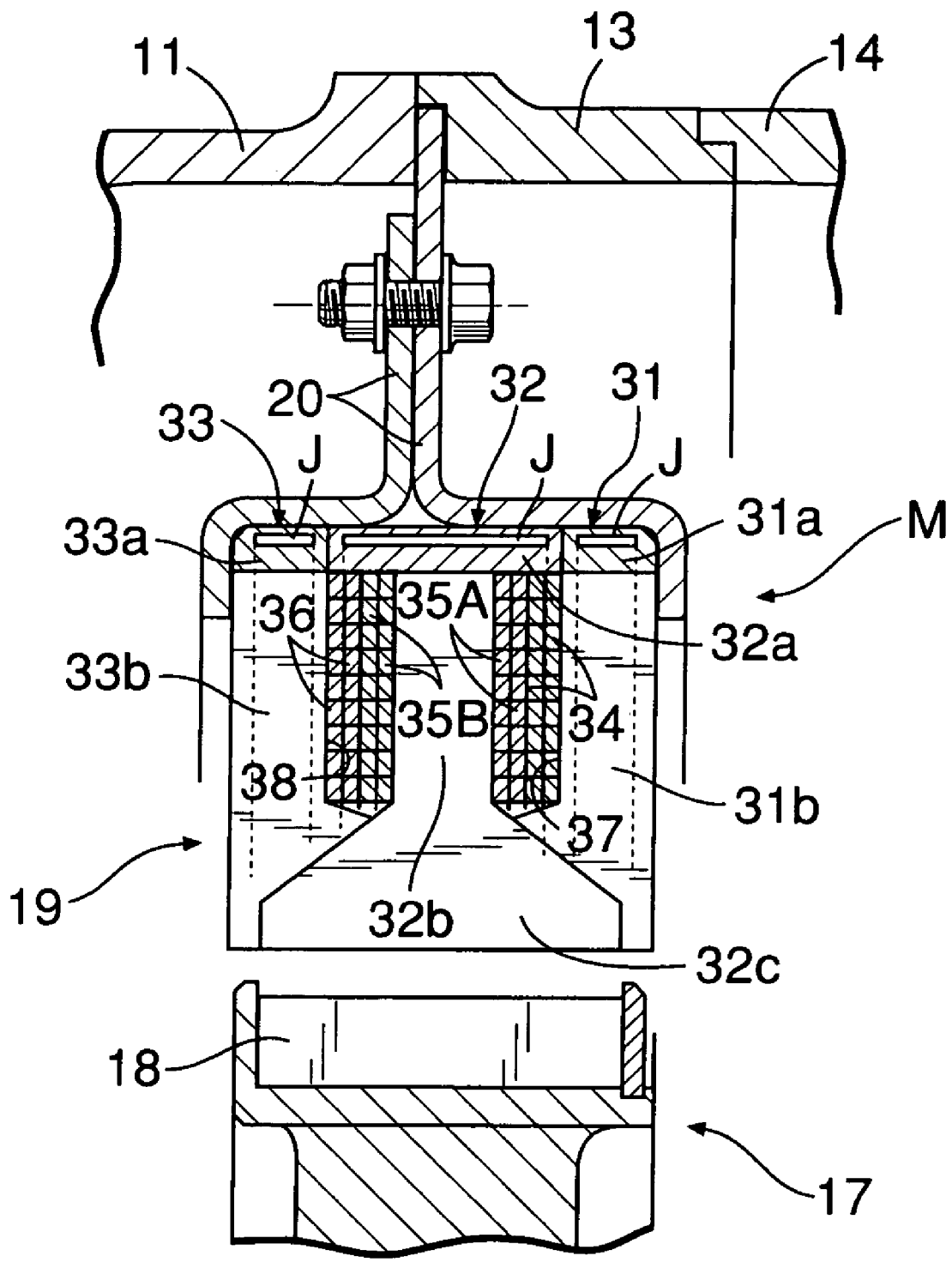
FIG. 4 is a sectional view taken along line 4—4 in FIG. 2.

As is clear from FIGS. 4, 6, and 7, the V-phase stator ring 32 includes an annular return path 32a, a plurality of, e.g., nine teeth 32b extending radially inward from peripherally equidistant positions on the return path 32a, and a plurality of, e.g., nine poles 32c further extending radially inward from radially inner ends of these teeth 32b. The radially inner end of each pole 32c extends into a T-shape toward opposite sides in the axial L direction while tapering. The teeth 32b are portions corresponding to the height of the coils 34, 35A, 35B, and 36. The poles 32c are portions located radially inside the teeth 32b.

Figure 5:
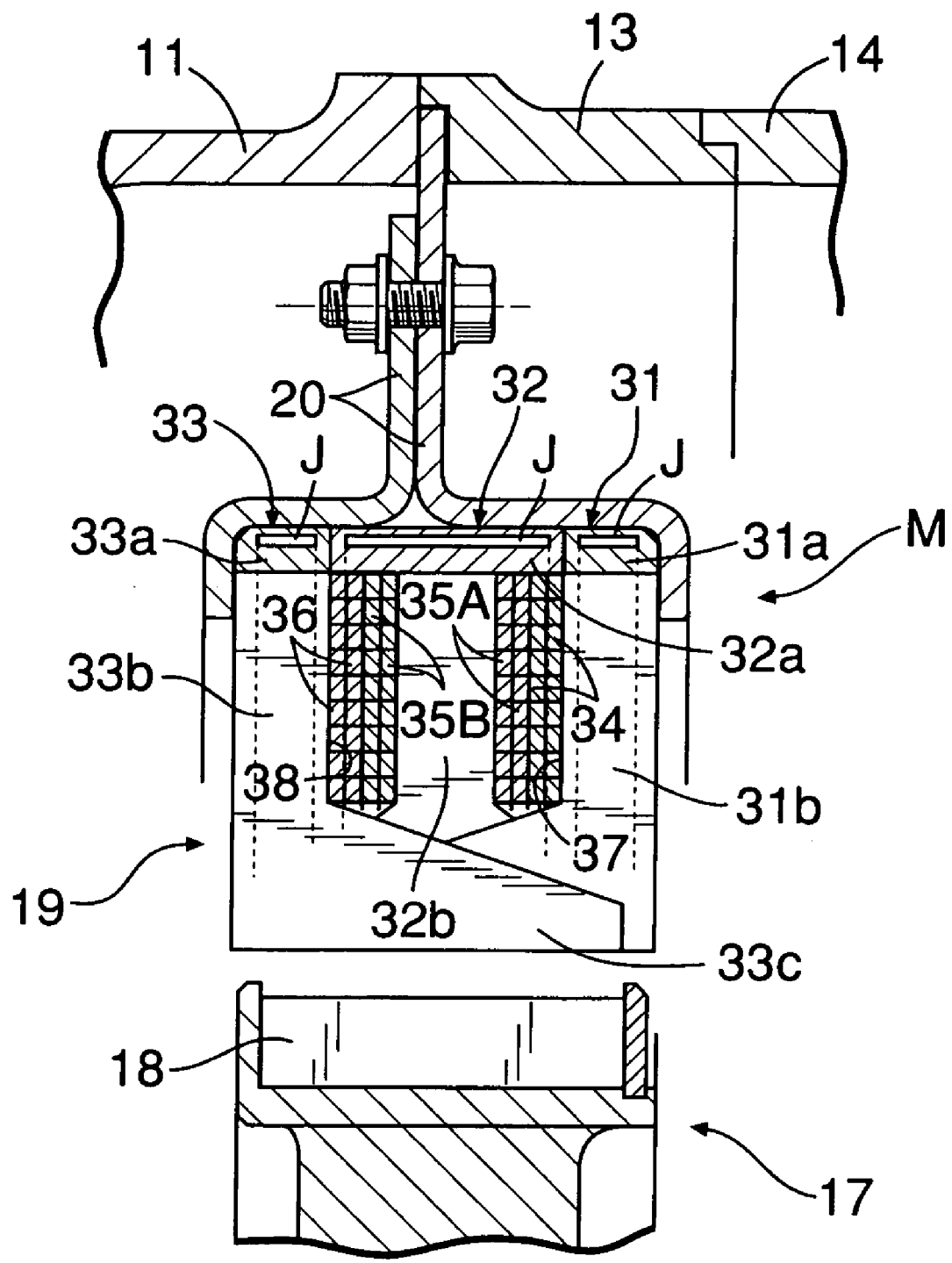
FIG. 5 is a sectional view taken along line 5—5 in FIG. 2.

As is clear from FIGS. 5, 6, and 7, the W-phase stator ring 33 is a member that is mirror symmetric with the U-phase stator ring 31 with respect to the V-phase stator ring 32, and when flipped, has a shape interchangeable with the U-phase stator ring 31. Reference numerals and symbols of portions of the W-phase stator ring 33 are obtained by changing the '31' of the reference numerals and symbols of the portions of the U-phase stator ring 31 to '33'.

The motor M is operated with three-phase alternating current, and the poles 31c, 32c, and 33c of the U-phase, the V-phase, and the W-phase, respectively, are each displaced by an electrical angle of 360°/3=120° in the peripheral direction. In contrast, each permanent magnet 18 of the rotor 17 is shared among the U-phase, V-phase, and W-phase poles 31c, 32c, and 33c, respectively, and generates magnetic fluxes in phase with each other. As a result, a uniform torque is generated in the rotor 17 by the poles 31c, 32c, and 33c of the respective phases.

As is clear from FIG. 6, the poles 31c of the U-phase, the poles 32c of the V-phase, and the poles 33c of the W-phase have substantially the same rectangular shape, and are disposed, in turn, along the inner peripheral face of the stator 19. Since the width in the axial L direction of the poles 31c, 32c, and 33c is substantially the same as the width in the axial L direction of the permanent magnets 18 of the rotor 17, the magnetic flux linkage between the stator 19 and the rotor 17 is maximized, thereby increasing the output torque of the rotor 17. Moreover, since the permanent magnets 18 are shared among the U-phase, V-phase, and W-phase poles 31c, 32c, and 33c, respectively, it is not necessary to divide the permanent magnets 18 in the axial L direction to correspond to the poles 31c, 32c, and 33c of each phase, thereby reducing the number of permanent magnets 18.

As is clear from FIGS. 3 and 6, an annular slot 37 is formed between the teeth 31b of the U-phase stator ring 31 and the teeth 32b of the V-phase stator ring 32. The slot 37 accommodates the U-phase coil 34 and one of the V-phase coils 35A or 35B, which have been wound in advance. An annular slot 38 is also formed between the teeth 33b of the W-phase stator ring 33 and the teeth 32b of the V-phase stator ring 32. The W-phase coil 36 and the other one of the V-phase coils 35B or 35A, which are wound in advance, are housed in the annular slot 38.

That is, in the three-phase motor M of this embodiment, the number of annular slots 37 and 38, that is, 2, is 1 less than the number of phases. Also, one of the annular slots 37 houses the first phase (U-phase) and second phase (V-phase) coils 34 and 35A, and the other one of the annular slots 38 houses the second phase (V-phase) and third phase (W-phase) coils 35B and 36.

In this way, since the U-phase coil 34 and the one V-phase coil 35A are fixedly held between the teeth 31b of the U-phase stator ring 31 and the teeth 32b of the V-phase stator ring 32, and the W-phase coil 36 and the other V-phase coil 35B are fixedly held between the teeth 33b of the W-phase stator ring 33 and the teeth 32b of the V-phase stator ring 32, it is unnecessary to use a special fixing member to fix each coil 34, 35A, 35B, and 36. Moreover, since each coil 34, 35A, 35B, and 36 is housed within the annular slot 37 or 38 and there is no possibility of interfering with an external component, it is easy to control the dimensions of the external component.

Each coil 34, 35A, 35B, and 36 uses, as a conductor, a flat wire having a rectangular cross-section. The conductor is wound in a plurality of, e.g., nine layers in the radial direction and two layers in the axial L direction. The directions of the magnetomotive forces of the U-phase coil 34 and the V-phase coil 35A housed in one annular slot 37 are set to be reverse relative to each other. The directions of the magnetomotive forces of the W-phase coil 36 and the V-phase coil 35B housed in the other annular slot 38 are also set to be reverse relative to each other. Additionally, the directions of the magnetomotive forces of the V-phase coils 35A and 35B housed respectively in the annular slots 37 and 38 are set to be reverse relative to each other. That is, the directions of the magnetomotive forces of the four coils 34, 35A, 35B, and 36 sequentially arranged in the axial L direction are set to be alternately reverse relative to each other.

Supplying three-phase alternating current by star-connecting or delta-connecting the U-phase coil 34, the V-phase coils 35A and 35B, and the W-phase coil 36 forms a rotating magnetic field in the U-phase poles 31c, the V-phase poles 32c, and the W-phase poles 33c, which are arranged, in turn, on the inner peripheral face of the stator 19. As such, the rotor 17 is able to be rotated by means of an electromagnetic force generated between the poles and the permanent magnets 18.

If the coil of each phase is independently connected, it is necessary to use an H bridge circuit combining four switching elements in order to energize the coils in both directions. Therefore, it is necessary to use a total of 4N switching elements for coils for N phases. However, by using star-connection or delta-connection, part of the circuit is shared to use only 2N switching elements, which is half of the number, thereby simplifying the circuit.

As hereinbefore described, since the U-phase, V-phase, and W-phase coils 34, 35A, 35B, and 36, respectively, are housed in the two annular slots 37 and 38, which are formed between the U-phase, V-phase, and W-phase teeth 31b, 32b, and 33, it is possible to provide only three teeth 31b, 32b, and 33b and two annular slots 37 and 38 for the three phases, that is, the U-phase, the V-phase, and the W-phase. Therefore, as compared with a conventional arrangement that requires six teeth and three annular slots, the present invention provides a reduced thickness in the axial L direction of the stator 19, thus making the motor M thin, wherein the motor M is easily arranged in a small space between the engine E and the transmission T.

The cooling structure of the stator 19 of the motor M is now explained.

The U-phase stator ring 31, the V-phase stator ring 32, and the W-phase stator ring 33 are formed from a compacted magnetic powder material. For example, a compacted powder material, which is manufactured by Hoganas and in which the surface of an iron alloy magnetic powder is covered by an inorganic material coating, is press-molded into a predetermined shape using a mold, and the molding is subjected to a sizing treatment for adjusting the shape and then to a thermal curing treatment to produce the U-phase stator ring 31, the V-phase stator ring 32, and the W-phase stator ring 33. In this way, use of a compacted magnetic powder material enables the U-phase stator ring 31, the V-phase stator ring 32, and the W-phase stator ring 33, which have a complicated shape, to be easily produced.

Annular cooling medium passages J are formed in outer peripheral portions of the U-phase stator ring 31, the V-phase stator ring 32, and the W-phase stator ring 33 of the stator 19 using a core during molding of the compacted powder. Moreover, having cooling water or cooling air as a cooling medium flow into the cooling medium passages J suppresses an increase in temperature due to heat generated in the U-phase coil 34, the V-phase coils 35A and 35B, and the W-phase coil 36. Since the cooling medium passages J are provided in the interior of each of the. U-phase stator ring 31, the V-phase stator ring 32, and the W-phase stator ring 33 of the stator 19, the external shape of the stator 19 is not affected, thereby not providing any problem in holding the stator 19 by the stator holder 20. Furthermore, since the cooling medium passages J are directly provided in the interior of the stator 19, the cooling effect by the cooling medium is sufficiently ensured, the cooling medium is prevented from leaking, and the degree of freedom in the method of holding the stator 19 is increased.

A second embodiment of the present invention is now explained with reference to FIGS. 8A and 8B.

The U-phase, V-phase, and W-phase teeth 31b, 32b, and 33b, respectively, of the stator 19 of the first embodiment are arranged at different phases in the peripheral direction. Also, the poles 31c, 32c, and 33c extending in the axial L direction from the radially inner ends of the teeth 31b, 32b, and 33b have the same length as the thickness in the axial L direction of the stator 19. The width of the permanent magnets 18 of the rotor 17 is the same as the width of the poles 31c, 32c, and 33c. Additionally, the permanent magnets 18 are shared between the poles 31c, 32c, and 33c of the respective phases.

In contrast, U-phase, V-phase, and W-phase teeth 31b, 32b, and 33b of a stator 19 of the second embodiment are arranged in phase with each other. Also, poles 31c, 32c, and 33c extending radially inward from the teeth 31b, 32b, and 33b are also arranged in phase with each other. However, the permanent magnets 18 disposed on the outer periphery of a rotor 17 are arranged in three steps in the axial L direction to correspond to the poles 31c, 32c, and 33c of each phase, and are each out of phase in the peripheral direction by an electrical angle of 360°/3=120°. The structure of U-phase, V-phase, and W-phase coils 34, 35A, 35B, and 36, respectively, which are not illustrated, is the same as that of the first embodiment.

In accordance with this second embodiment, the thickness in the axial L direction of the stator 19 is also reduced as in the above-mentioned first embodiment, but since the permanent magnets 18 are divided into three steps, the number of components increases accordingly. Moreover, since the area of the poles 31c, 32c, and 33c of each phase facing the permanent magnets 18 is smaller, the output torque of the rotor 17 decreases accordingly. However, since the poles 31c, 32c, and 33c of the stator 19 can be in phase with each other, the structure of the stator 19 is simplified. A third embodiment of the present invention is now explained with reference to FIGS. 9A and 9B.

In the third embodiment, U-phase, V-phase, and W-phase teeth 31b, 32b, and 33b, respectively, of the stator 19 are out of phase in the peripheral direction by an electrical angle of 360°/3=120° each in the same way as in the first embodiment, but poles 31c, 32c, and 33c extending radially inward from the teeth 31b, 32b, and 33b are not widened in the axial L direction. Permanent magnets 18 arranged in the outer periphery of a rotor 17 are arranged in three steps in the axial L direction to correspond to the poles 31c, 32c, and 33c of each phase, but are in phase with each other. The structure of U-phase, V-phase, and W-phase coils 34, 35A, 35B, and 36, which are not illustrated, is the same as in the first embodiment.

In accordance with this third embodiment, it is also possible to reduce the thickness in the axial L direction of the stator 19 as in the above-mentioned first embodiment, but since the permanent magnets 18 are divided into three steps, the number of components increases accordingly. Moreover, since the area of the poles 31c, 32c, and 33c of each phase facing the permanent magnets 18 is smaller, the output torque of the rotor 17 decreases accordingly. However, since the permanent magnets 18 of the rotor 17 can be in phase with each other, the structure of the rotor 17 is simplified. By using the same permanent magnets 18 as in the rotor 17 of the first embodiment without dividing the permanent magnets 18 into three steps, the number of components is reduced.

Other embodiments of the cooling medium passage J of the stator 19 are now explained with reference to FIGS. 10A and 10B.

Figure 10A:
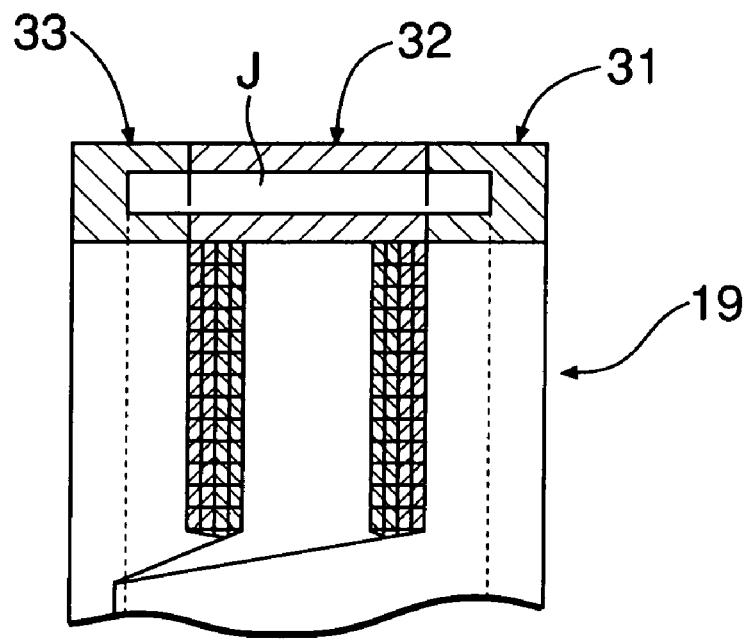
FIGS. 10A and 10B are diagrams showing cooling medium passages of other embodiments of the present invention.

In the embodiment of FIG. 10A, the common cooling medium passage J is provided across a U-phase stator ring 31, a V-phase stator ring 32, and a W-phase stator ring 33a of the stator 19. Although it is necessary to take into consideration the sealing of mating faces of the stator 19, a core is not needed in molding a compacted powder so that the cost is reduced accordingly, as compared with a case where a plurality of independent cooling medium passages J are provided in the U-phase stator ring 31, the V-phase stator ring 32, and the W-phase stator ring 33 of the stator 19. Moreover, the cross-sectional area of the passage is increased and the piping that supplies a cooling medium is simplified.

Figure 10B:
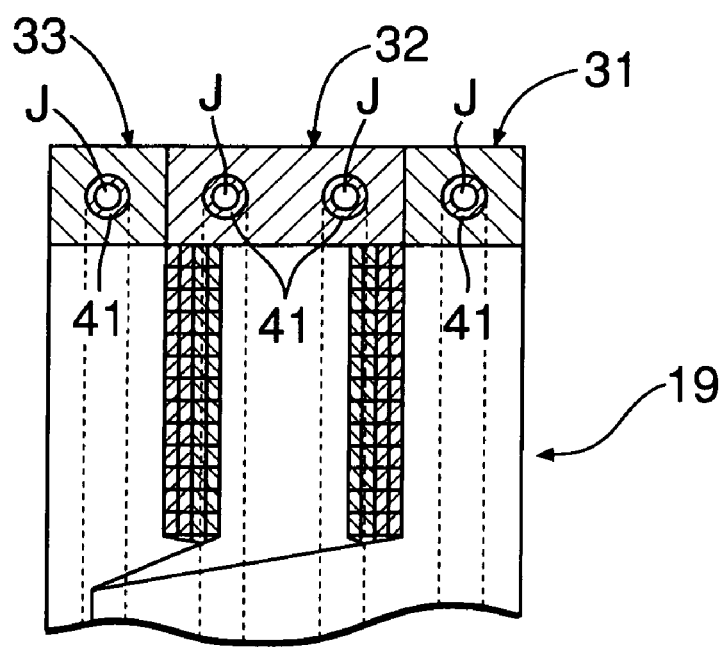

In the embodiment shown in FIG. 10B, cooling medium passages J are formed by embedding copper pipes 41, which have high thermal conductivity, during compacted powder molding of the stator 19 to reduce the cost compared with a case in which cooling medium passages J are formed using a core.

Yet other embodiments of the cooling medium passage J of the stator 19 are now explained with reference to FIGS. 11A–D.

Figure 11C:
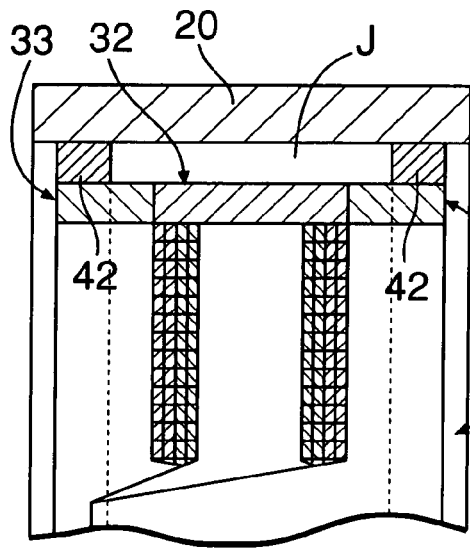
FIGS. 11A–D are diagrams showing cooling medium passages of yet other embodiments of the present invention.
Figure 11A:
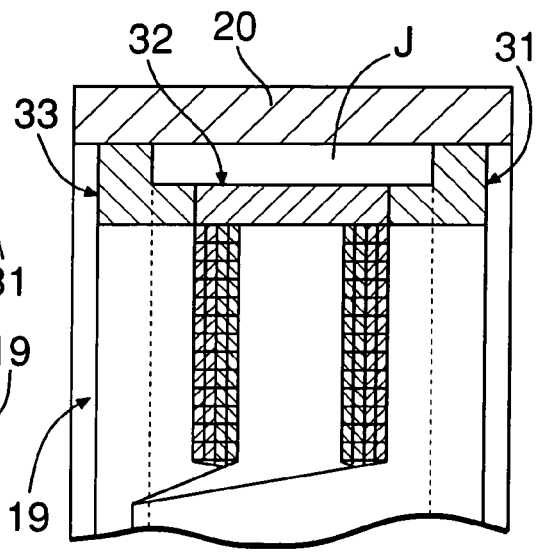

An embodiment shown in FIG. 11A is a modification of the embodiment shown in FIG. 10A. In particular, a single cooling medium passage J is formed between the outer peripheral face of the stator 19 and the inner peripheral face of the annular stator holder 20, which holds the stator 19. In accordance with this embodiment, although it is necessary to take into consideration the sealing of mating faces of the stator 19 and the stator holder 20, a core is not needed to form the cooling medium passage J, and the cost is reduced.

Figure 11D:
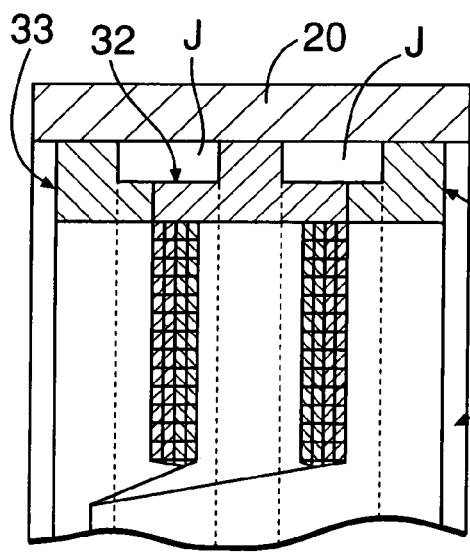
Figure 11B:
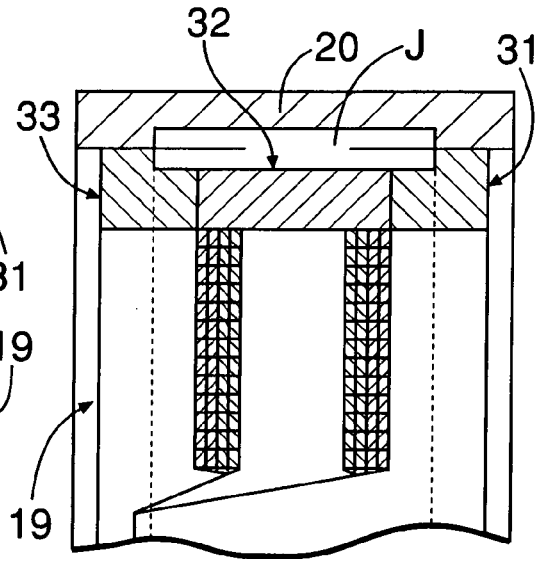

An embodiment shown in FIG. 11B is a modification of the embodiment shown in FIG. 11A. In particular, a cooling medium passage J is formed by cooperation between recesses provided in both the outer peripheral face of the stator 19 and the inner peripheral face of the stator holder 20. In this embodiment, since the cooling medium passage J is formed by cooperation between the recess of the stator 19 and the recess of the stator holder 20, the cross-sectional area of the cooling medium passage J is secured while maintaining the strength and magnetic path of the stator 19 by reducing the dimensions of the recess on the stator 19 side.

In an embodiment shown in FIG. 11C, the outer peripheral face of the stator 19 is a simple cylindrical face. That is, two reinforcing rings 42 are press-fitted around the outer peripheral faces of the U-phase stator ring 31 and the W-phase stator ring 33, which are on opposite sides in the axial direction. Furthermore the stator holder 20 is press-fitted around the outer peripheral faces of the reinforcing rings 42. In accordance with this embodiment, while providing the greatest simplification of the shapes of the stator 19 and the stator holder 20, a cooling medium passage J having a large cross-sectional area is formed via cooperation between the stator 19, the reinforcing rings 42, and the stator holder 20. Moreover, the stator 19 is reinforced by the reinforcing rings 42.

An embodiment shown in FIG. 11D is a modification of the embodiment shown in FIG. 11A. In particular, two cooling medium passages J are formed between the inner peripheral face of the stator holder 20 and two channels on the outer peripheral face of the stator 19. In accordance with this embodiment, the same effect as that of the embodiment of FIG. 11A is achieved.

Embodiments in which cooling is carried out using cooling fins F are explained with reference to FIGS. 12A–C.

Figure 12A:
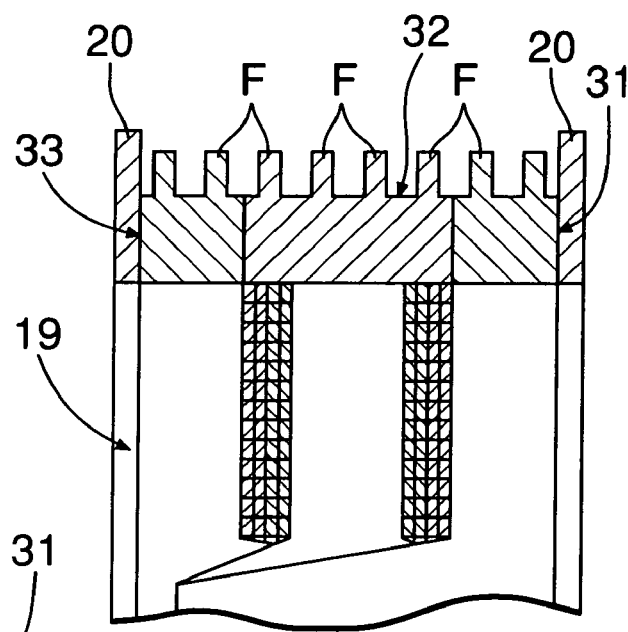
FIGS. 12A–C are diagrams showing embodiments of the present invention having cooling fins.

In an embodiment shown in FIG. 12A, a plurality of annular cooling fins F are projectingly provided on the outer peripheral face of the stator 19. Since the outer peripheral face of the stator 19 cannot be held by the annular stator holder 20 due to interference with the cooling fins F, opposite sides of the stator 19 are held by the plate-shaped stator holder 20.

Since the cooling fins F are formed at the same time as when molding the U-phase stator ring 31, the V-phase stator ring 32, and the W-phase stator ring 33 using a compacted powder, the cost is lower than a case where cooling fins are formed as separate members and fixed afterward. Moreover, since the thermal transfer efficiency from the main body of the stator 19 to the cooling fins F is high, the cooling effect improves. Furthermore, since cooling air is used as the cooling medium, not only is it unnecessary to use a pump, pipe, radiator, etc., which are required when a liquid cooling medium is used, but it is also unnecessary to take leakage of the cooling medium into consideration.

Figure 12C:
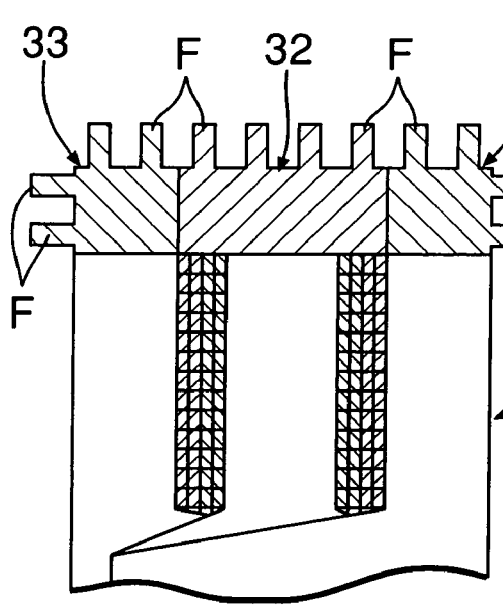
Figure 12B:
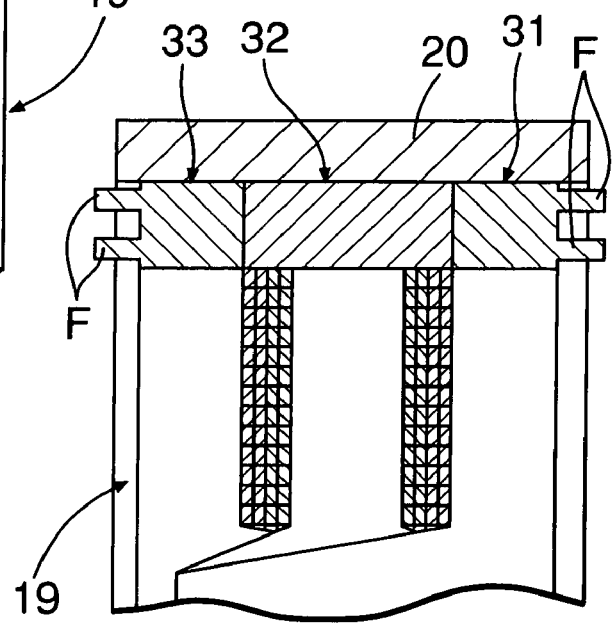

In an embodiment shown in FIG. 12B, a plurality of cooling fins F are projectingly provided in an annular shape on the U-phase stator ring 31 and the W-phase stator ring 33 forming opposite sides of the stator 19. In accordance with this embodiment, since there are no cooling fins F on the outer peripheral face of the stator 19, it is possible to hold the stator 19 via the annular stator holder 20, thereby simplifying the holding structure.

In an embodiment shown in FIG. 12C, cooling fins F are projectingly provided on the outer peripheral face and opposite sides of the stator 19, and it is possible to increase the number of cooling fins F, thus enhancing the cooling effect. However, in this embodiment, since the stator 19 cannot be held by the stator holders 20 shown in FIG. 12A or FIG. 12B, it is necessary to cut away the cooling fins F at several locations in the circumferential direction of the stator 19 to hold the stator 19 at these locations.

Although embodiments of the present invention are explained above, the present invention is not limited to the above-mentioned embodiments, and can be modified in a variety of ways without departing from the subject matter of the present invention. For example, although the three-phase claw pole motor M is illustrated in the discussed embodiments, the present invention can also be applied to an N-phase (N being a natural number of 3 or more) claw pole motor. Furthermore, the claw pole motor M is used as a motor for running a hybrid vehicle in the discussed embodiments, but the use is not limited thereto.

Moreover, the stator rings 31, 32, and 33 of the respective phases in the discussed embodiments are formed using a compacted powder material, but various other types of material can be employed. That is, when the stator rings 31, 32, and 33 are formed using any one of a solid magnetic substance, a solid sintered material, and a compacted powder material, molding is easier than a case in which they are formed using a laminated steel sheet. When they are formed using a solid magnetic substance or a solid sintered material, the cost can be reduced, and when they are formed using a compacted powder material, the loss of magnetic flux can be reduced.

Furthermore, although the stator rings 31, 32, and 33 of the respective phases in the discussed embodiments are integrally molded, the return paths 31a, 32a, and 33a, the teeth 31b, 32b, and 33b, and the poles 31c, 32c, and 33c can be formed separately as required, thereby increasing the degrees of freedom in their design.

Moreover, the coils 34, 35A, 35B, and 36 of the respective phases in the discussed embodiments use, as a conductor, flat wire having a rectangular cross-section, but it is also possible to employ a conductor having a regular polygonal cross-section, such as square or hexagonal, or a circular cross-section. If a conductor having a rectangular cross-section or a regular polygonal cross-section is used, the packing factor of the coils 34, 35A, 35B, and 36 is increased, and if a conductor having a circular cross-section is used, it contributes to a reduction in cost.

Furthermore, with regard to the cooling medium for cooling the stator 19 in the discussed embodiments, cooling water and cooling air, which are the most inexpensive, are cited as examples, but any other cooling medium can also be used.

What is claimed is:

1. A claw pole motor stator comprising:
   teeth for N phases, wherein N is a natural number of 3 or more, juxtaposed in an axial direction;
   return paths for interconnecting the teeth for N phases;
   (N−1) annular slots formed between teeth for N phases; and
   coils for N phases disposed in the (N−1) annular slots,
   wherein a plurality of poles project radially inward from inner ends of the teeth for N phases, extend in said axial direction,
   wherein the poles for one of the N phases are at least partially overlapped by the poles of another of the N phases in the axial direction when viewed in a circumferential direction,
   wherein the poles for N phases are arranged in phase with each other, and magnets of the rotor are arranged so that magnetic poles of the same polar sign are displaced in the peripheral direction relative to the poles for each phase, and
   wherein generated magnetic fluxes are displaced by electrical angles of 360°/N.

2. The claw pole motor stator according to claim 1, wherein the poles are arranged in a peripheral direction at predetermined intervals and have a radially inner end thereof facing an outer peripheral face of a rotor.

3. The claw pole motor stator according to claim 1, wherein the return paths, the teeth, or the poles comprise any one of a solid magnetic substance, a solid sintered material, and a compacted powder material.

4. The claw pole motor stator according to claim 1, wherein the return paths, the teeth, and the poles are formed integrally or separately.

5. The claw pole motor stator according to claim 1, wherein a cross-sectional shape of a conductor of the coil of each phase is any one of rectangular, regular polygonal, and circular.

6. The claw pole motor stator according to claim 1, wherein the coil disposed in the annular slot is fixedly held between adjacent teeth.

7. The claw pole motor stator according to claim 1, wherein the coil for a phase m, wherein m is a natural number of N−1 or less, and the coil for a phase m+1 are disposed within an $m^{th}$ annular slot.

8. The claw pole motor stator according to claim 7, wherein the coil for the phase m and the coil for the phase m+1 have magnetomotive forces in reversed directions relative to each other.

9. The claw pole motor stator according to claim 8, wherein the coil for the phase m+1 disposed in the $m^{th}$ annular slot and the coil for the phase m+1 disposed in the $(m+1)^{th}$ annular slot have magnetomotive forces in reversed directions relative to each other.

10. The claw pole motor stator according to claim 1, wherein the coils for N phases are star-connected or delta-connected.

11. The claw pole motor stator according to claim 1, wherein the stator comprises a cooling structure.

12. The claw pole motor stator according to claim 11, wherein the cooling structure cools the stator using at least one of cooling water and cooling air.

13. The claw pole motor stator according to claim 11, wherein the cooling structure is provided in at least one of an interior portion and a peripheral portion of the stator.

14. The claw pole motor stator according to claim 13, wherein the cooling structure provided in the peripheral portion of the stator comprises at least one recess, at least one projection, or a plurality of cooling fins.

15. The claw pole motor stator according to claim 13, wherein the cooling structure provided in the interior of the stator has at least one cooling space.

16. The claw pole motor stator according to claim 15, wherein the cooling space is formed by cooperation between the stator and a holder for the stator.

17. The claw pole motor stator according to claim 15, wherein the cooling space is formed by cooperation between the stator, a holder for the stator, and a reinforcing ring held between the stator and the holder.

18. A claw pole motor stator comprising:
teeth for N phases, wherein N is a natural number of 3 or more, juxtaposed in an axial direction;
return paths for interconnecting the teeth for N phases;
(N−1) annular slots formed between teeth for N phases; and
coils for N phases disposed in the (N−1) annular slots,
wherein a plurality of poles project radially inward from inner ends of the teeth for N phases, extend in said axial direction,
wherein the poles for one of the N phases are at least partially overlapped by the poles of another of the N phases in the axial direction when viewed in a circumferential direction,
wherein the poles are arranged in a peripheral direction at predetermined intervals and have a radially inner end thereof facing an outer peripheral face of a rotor,
wherein the poles for N phases are displaced by electrical angles of 360°/N relative to each other, and magnets of the rotor are arranged so that magnetic poles of the same polar sign are aligned in the axial direction, and
wherein generated magnetic fluxes are in phase with each other in the axial direction.

19. The claw pole motor stator according to claim 18, wherein the radially inner ends of the poles for each phase extend in the axial direction along the outer peripheral face of the rotor.

20. The claw pole motor stator according to claim 19, wherein the radially inner ends of the poles for each phase extend to the axial ends of the rotor.

* * * * *